(No Model.)
J. R. MILES & J. K. BALDRIDGE.
VEHICLE BRAKE.
No. 300,884. Patented June 24, 1884.
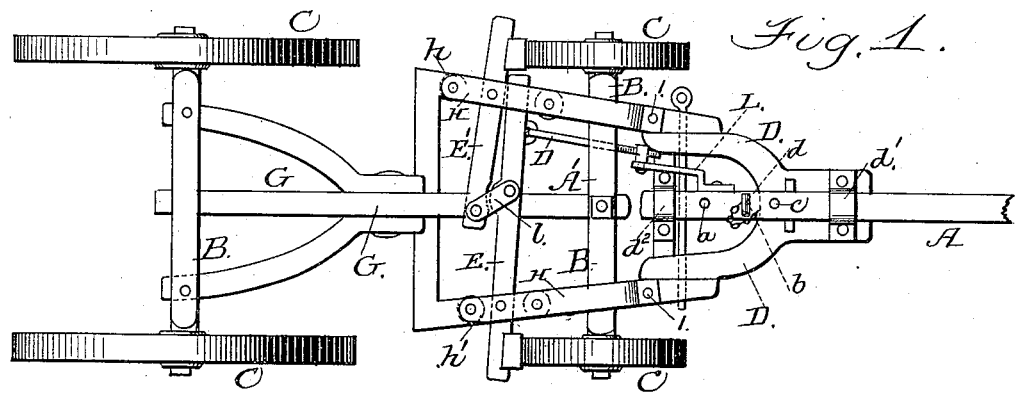
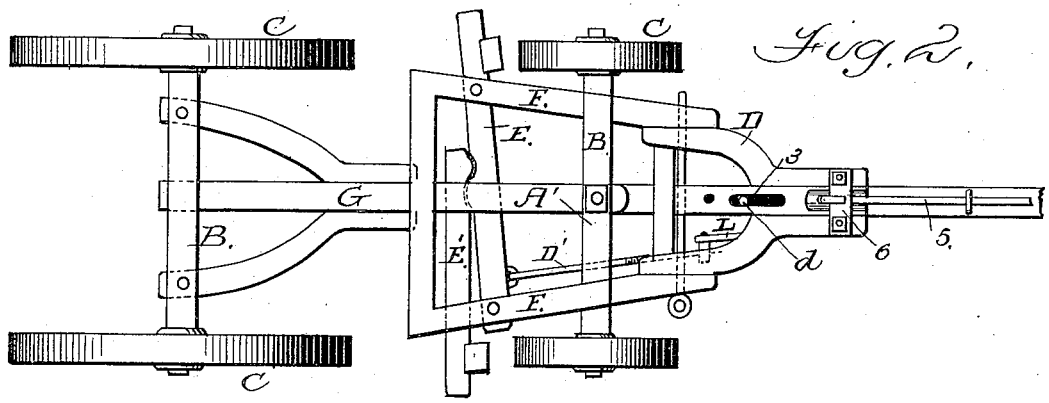
Attest:
Walter Fowler
H. B. Applewhaite
Inventor;
James R. Miles
James K. Baldridge
Per Atty. A. H. Evans & Co.

UNITED STATES PATENT OFFICE.

JAMES R. MILES AND JAMES K. BALDRIDGE, OF RALSTON STATION, TENN.

VEHICLE-BRAKE.

SPECIFICATION forming part of Letters Patent No. 300,884, dated June 24, 1884.

Application filed March 26, 1884. (No model.)

*To all whom it may concern:*

Be it known that we, JAMES R. MILES and JAMES K. BALDRIDGE, citizens of the United States, residing at Ralston Station, in the county of Weakley and State of Tennessee, have invented certain new and useful Improvements in Vehicle-Brakes, of which the following is a full, clear, and exact description, reference being had to the accompanying drawings, forming part of this specification, in which—

Figure 1 is a plan view of the running-gear of a vehicle with our improvements attached. Fig. 2 is a bottom plan view of the same.

Our invention relates to that class of brakes in which the levers for checking the wheels are pivoted directly to and above the bolster, the said levers being operated by a rod secured to a sliding pole; and our invention consists in the novel construction and combination of devices, as will be hereinafter more fully set forth, and specifically pointed out in the claim.

To enable others skilled in the art to make and use our invention, we will now proceed to describe the exact manner in which we have carried it out.

In the said drawings, A represents a sliding pole, B B' the axles, and C the wheels, which constitute the running-gear of a vehicle constructed in the usual manner. The sliding pole is provided with perforations $a\ b\ c$, and is also provided with a staple, to which is secured one end of a short chain carrying on its outer end a coupling-pin, $d$, which is adapted to be placed within the perforation $c$ and through a similar perforation formed in the forward hounds, thereby locking the pole and preventing the brake-levers from bearing against the wheels. The forward hounds are also formed with a slot, 3, in which the coupling-pin works when the said pin is placed in either of the perforations $a\ b$. Thus it will be readily observed that if the pin be removed from the perforation $c$ the pole is permitted to move backward and forward, for a purpose to be hereinafter more fully set forth. The pole A rests upon the forward hounds, D, to which it is secured by any of the well-known means, by staples or guides $d'\ d^2$, in which the said pole may have a forward and backward movement. If necessary, the pole may be provided with a projecting lug, which prevents the pole from being drawn out of the staple or guides by the forward movement of the team.

Secured to the under side of the forward hounds is a plate or loop, 6, adapted to engage the hooked end of a rod, 5, which is also secured by staples to the sliding pole. The object of this rod 5 is that the forward team may be attached to the rod in such a manner that the movements of the said teams will have no effect whatever on the brake-levers.

To one side of the sliding pole is secured an angular projecting arm, L, provided with a swivel-threaded nut adapted to engage the threaded end of the brake-rod D', which passes through an opening formed in the bolster A'. The rod D' is formed at its inner end with an eye, by means of which the said rod is secured to the brake-levers E E', the said levers being also provided with the usual rubber blocks, as shown in Fig. 1. The forward hounds are pivotally connected to the frame F by a bolt or other well-known means, and to this frame F is also rigidly secured to the bolster A' an axle, B. A perforation is formed in the said bolster and axle, through which is passed the bolt which couples the forward portion of the running-gear to the coupling-pole G in the usual manner.

To the frame F are secured on each side brackets $h\ h'$, which are provided with openings, through which are passed and in which are pivoted the ends of the brake-levers E E'. Metal plates H are secured to the frame F at the point 1, and then extend backward over the said frame and bolster A', and are secured to the brackets $h\ h'$, as shown in Fig. 1, the said plates being also provided with perforations, through which is passed the pin, which acts as a pivot for the brake-levers.

The brake-lever E is formed near its center with a curved projection adapted to fit a corresponding opening formed in the lever E' when the said levers are brought together. Immediately over this projection and opening is secured a short plate or link, $l$, by means of which the levers are joined together and caused to act simultaneously.

The operation of our improved brake is as follows: The coupling-pin being in the perforation $a$ or $b$, the movement of the teams causes the sliding pole to move backward within the loops $d'\, d^2$. At the same time the rod $D'$, attached to the pole and brake-lever, forces the inner end of the lever E backward. This movement, by means of the short plate which joins the levers together, will cause the outer ends of the said levers carrying the rubber blocks to bear firmly against the wheels. If it be desired to keep the wheels in this condition, by simply placing the coupling-pin within the perforation $c$ the wheels remain locked until the pin is removed, when the forward movement of the teams will immediately release the brake-levers from their contact with the wheels.

Having thus fully described our invention, what we claim as new, and desire to secure by Letters Patent, is—

In a vehicle-brake, the pole A, having a projecting arm, L, provided with a swiveled threaded nut secured to its side, adapted to engage the threaded end of a rod, $D'$, in combination with the brake-levers E E', substantially as and for the purpose set forth.

JAMES R. MILES.
JAMES K. BALDRIDGE.

Witnesses:
T. R. MILES,
B. C. MICKLE.